US010877475B2

(12) United States Patent
Nonaka

(10) Patent No.: US 10,877,475 B2
(45) Date of Patent: Dec. 29, 2020

(54) ROBOT DEVICE AND METHOD OF CONTROLLING MOVEMENT OF ROBOT DEVICE

(71) Applicant: FUJIFILM Corporation, Tokyo (JP)

(72) Inventor: Shunichiro Nonaka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 65 days.

(21) Appl. No.: 15/802,798

(22) Filed: Nov. 3, 2017

(65) Prior Publication Data

US 2018/0074500 A1 Mar. 15, 2018

Related U.S. Application Data

(63) Continuation of application No. PCT/JP2016/053813, filed on Feb. 9, 2016.

(30) Foreign Application Priority Data

May 22, 2015 (JP) ................... 2015-104517

(51) Int. Cl.
*G05D 1/00* (2006.01)
*G05D 1/02* (2020.01)
(Continued)

(52) U.S. Cl.
CPC .......... *G05D 1/0088* (2013.01); *B25J 9/1666* (2013.01); *B25J 9/1697* (2013.01);
(Continued)

(58) Field of Classification Search
CPC combination set(s) only.
See application file for complete search history.

(56) References Cited

U.S. PATENT DOCUMENTS 4,899,296 A * 2/1990 Khattak ................. G01B 11/16
348/148
4,958,306 A * 9/1990 Powell ..................... G01C 7/04
702/40
(Continued)

FOREIGN PATENT DOCUMENTS

JP S63-186308 A 8/1988
JP H07-281753 A 10/1995
(Continued)

OTHER PUBLICATIONS

The extended European search report issued by the European Patent Office dated May 4, 2018, which corresponds to European Patent Application No. 16799605.7-1204 and is related to U.S. Appl. No. 15/802,798.
(Continued)

*Primary Examiner* — Khoi H Tran
*Assistant Examiner* — Jorge O Peche
(74) *Attorney, Agent, or Firm* — Studebaker & Brackett PC

(57) ABSTRACT

The robot device includes a spatial information recording unit where first spatial information about an area in which the movement of a robot device to be self-propelled with respect to a structure is supposed and which is associated with the structure is recorded, a spatial information acquisition section that is mounted on the robot device and acquires second spatial information about a peripheral area of the robot device with the movement of the robot device, and a spatial information updating unit that updates the first spatial information recorded in the spatial information recording unit with the second spatial information acquired by the spatial information acquisition section. The first spatial information recorded in the spatial information
(Continued)

recording unit is used in a case in which the robot device is moved with respect to the structure.

15 Claims, 10 Drawing Sheets

(51) Int. Cl.
*B25J 9/16* (2006.01)
*E01D 22/00* (2006.01)

(52) U.S. Cl.
CPC ........... *G05D 1/0231* (2013.01); *E01D 22/00* (2013.01); *G05B 2219/39391* (2013.01)

(56) References Cited

U.S. PATENT DOCUMENTS

| | | | | |
|---|---|---|---|---|
| 7,860,680 | B2* | 12/2010 | Arms | H02J 13/00017 702/127 |
| 8,639,644 | B1* | 1/2014 | Hickman | G06N 3/008 706/14 |
| 9,193,068 | B2* | 11/2015 | Chin | G07C 5/008 |
| 9,193,402 | B2* | 11/2015 | Chin | B25J 5/00 |
| 9,469,030 | B2* | 10/2016 | Wang | G16H 40/67 |
| 9,604,563 | B1* | 3/2017 | Wilson, II | B60P 3/14 |
| 9,785,149 | B2* | 10/2017 | Wang | B25J 9/1689 |
| 10,391,633 | B1* | 8/2019 | Hickman | B25J 9/1656 |
| 2003/0030398 | A1* | 2/2003 | Jacobs | G05D 1/0225 318/568.12 |
| 2003/0030399 | A1* | 2/2003 | Jacobs | G05D 1/0274 318/568.16 |
| 2004/0167688 | A1* | 8/2004 | Karlsson | G05D 1/024 701/23 |
| 2006/0058921 | A1* | 3/2006 | Okamoto | G05D 1/0214 700/255 |
| 2006/0064202 | A1* | 3/2006 | Gutmann | G05D 1/0251 700/245 |
| 2007/0039390 | A1* | 2/2007 | Duncan | G01N 29/265 73/606 |
| 2009/0024336 | A1* | 1/2009 | Tatom | G01G 19/022 702/56 |
| 2009/0301203 | A1* | 12/2009 | Brussieux | G01N 29/225 73/627 |
| 2010/0030378 | A1* | 2/2010 | Choi | G01S 1/54 700/245 |
| 2010/0049367 | A1* | 2/2010 | Yang | E01D 19/106 700/259 |
| 2010/0235037 | A1* | 9/2010 | Vian | G07C 5/0808 701/31.4 |
| 2011/0106313 | A1* | 5/2011 | Lee | B25J 5/007 700/259 |
| 2012/0121161 | A1* | 5/2012 | Eade | G05D 1/0253 382/153 |
| 2012/0215348 | A1* | 8/2012 | Skrinde | B25J 11/0085 700/245 |
| 2014/0074342 | A1* | 3/2014 | Wong | B66F 9/0755 701/26 |
| 2014/0324271 | A1* | 10/2014 | Oh | G05D 1/0274 701/28 |
| 2015/0025788 | A1* | 1/2015 | Crain | G01S 13/90 701/400 |
| 2015/0039123 | A1* | 2/2015 | Lindgren | B29C 73/10 700/191 |
| 2015/0053015 | A1* | 2/2015 | Sarr | G01N 29/225 73/632 |
| 2016/0154643 | A1* | 6/2016 | Zhang | G01C 21/26 717/169 |
| 2016/0342145 | A1* | 11/2016 | Westcott | G06N 20/00 |
| 2016/0371977 | A1* | 12/2016 | Wingate | G08G 1/096844 |
| 2017/0108456 | A1* | 4/2017 | Alizadeh | G01M 5/0083 |
| 2017/0123435 | A1* | 5/2017 | Myeong | B25J 9/1676 |
| 2017/0285661 | A1* | 10/2017 | Harada | G05D 1/0088 |
| 2018/0004214 | A1* | 1/2018 | Wisniowski | G08G 1/096725 |
| 2018/0165931 | A1* | 6/2018 | Zhang | G08B 13/19621 |
| 2018/0178391 | A1* | 6/2018 | Naito | G05D 1/0214 |
| 2018/0348742 | A1* | 12/2018 | Byrne | G05B 19/41865 |
| 2019/0015981 | A1* | 1/2019 | Yabushita | B25J 9/1664 |
| 2019/0094861 | A1* | 3/2019 | Menzel | G08G 5/0069 |
| 2019/0212223 | A1* | 7/2019 | Kusaka | G01M 5/0008 |
| 2019/0256335 | A1* | 8/2019 | Araki | B66F 17/006 |
| 2019/0278288 | A1* | 9/2019 | Xiong | G06K 7/10722 |
| 2020/0004266 | A1* | 1/2020 | Eoh | B25J 9/1664 |
| 2020/0019156 | A1* | 1/2020 | Drew | G05D 1/0038 |
| 2020/0061824 | A1* | 2/2020 | Pholsiri | B25J 9/1669 |

FOREIGN PATENT DOCUMENTS

| | | |
|---|---|---|
| JP | H08-128015 A | 5/1996 |
| JP | 2009-169845 A | 7/2009 |
| JP | 4980606 B2 | 7/2012 |
| WO | 2007/037348 A1 | 4/2007 |
| WO | 2013/154888 A1 | 10/2013 |

OTHER PUBLICATIONS

International Search Report issued in PCT/JP2016/053813; dated May 10, 2016.
International Preliminary Report on Patentability issued in PCT/JP2016/053813; dated Sep. 6, 2016.
Communication pursuant to Article 94(3) EPC issued by the European Patent Office dated Oct. 14, 2020, which corresponds to European Patent Application No. 16 799 605.7-1202 and is related to U.S. Appl. No. 15/802,798.

\* cited by examiner

ROBOT DEVICE AND METHOD OF CONTROLLING MOVEMENT OF ROBOT DEVICE

CROSS-REFERENCE TO RELATED APPLICATIONS

This application is a Continuation of PCT International Application No. PCT/JP2016/053813 filed on Feb. 9, 2016, which claims priority under 35 U.S.C § 119(a) to Patent Application No. 2015-104517 filed in Japan on May 22, 2015, all of which are hereby expressly incorporated by reference into the present application.

BACKGROUND OF THE INVENTION

1. Field of the Invention

The present invention relates to a robot device and a method of controlling the movement of the robot device, and more particularly, to a technique for efficiently moving a robot device that performs the inspection, sensing, and the like of structures, such as a bridge and nuclear reactor.

2. Description of the Related Art

A mobile automatic monitoring device, which automatically monitors a desired object to be monitored by an imaging device, such as a video camera, or a laser scanner or the like loaded on a vehicle, has been proposed in the past (JP4980606B).

In the mobile automatic monitoring device disclosed in JP4980606B, the video camera or the like mounted on a moving body (vehicle) is moved together with the vehicle and acquires spatial information about the periphery of the vehicle and position coordinate information representing the three-dimensional position and the posture of the vehicle. The mobile automatic monitoring device generates integrated spatial information, in which three-dimensional spatial information about the periphery of the vehicle is integrated, on the basis of the acquired spatial information about the periphery of the vehicle, the acquired position coordinate information of the vehicle, and a three-dimensional map, which has been measured in advance, of an area to be monitored. Further, the mobile automatic monitoring device makes the integrated spatial information and the three-dimensional map correspond to each other to detect an object to be monitored (an object, an obstacle, a suspicious object, or the like to be predicted) that is present in the area to be monitored; makes image information required for the movement of the vehicle, the video of the object to be monitored, and computer graphics correspond to a viewpoint from the vehicle; synthesizes the image information required for the movement of the vehicle, the video of the object to be monitored, and the computer graphics on an actual video; and displays the synthesized video on a monitoring display unit.

Further, in the disclosure of JP4980606B, the presence or absence and attributes of the object to be monitored are determined, for example, the object to be monitored is determined as a dangerous object; it is determined whether a vehicle is to quickly get away from the object to be monitored or to approach the object to be monitored for detailed examination, is go around the object to be monitored, or is to trace the object to be monitored to observe the object to be monitored in each direction; and a steering wheel, an accelerator, a brake, and the like of the vehicle are controlled on the basis of the result of the determination to automatically drive the vehicle.

SUMMARY OF THE INVENTION

The mobile automatic monitoring device disclosed in JP4980606B is used in, for example, a monitoring system, an automatic driving system, an automatic working system, and the like that travel in a predetermined object to be monitored or a predetermined area to be monitored, such as a terminal or a runway of an airfield, a warehouse, or a large store, and monitor the area to be monitored; and is not a robot device that is self-propelled with respect to a structure, such as a bridge.

Furthermore, the mobile automatic monitoring device disclosed in JP4980606B needs to prepare a three-dimensional map unit, which accurately measures an area to be monitored in advance to generate a three-dimensional map and includes the generated three-dimensional map, to determine the presence or absence and attributes of an object to be monitored; and requires time and effort for the preparation of the three-dimensional map unit.

JP4980606B discloses that the three-dimensional map can be generated on the basis of spatial information about the periphery of the vehicle acquired by a spatial information acquisition section during the travel of the vehicle and position coordinate information of the vehicle acquired by a position coordinates acquisition unit, but it is difficult to generate a three-dimensional map while automatically driving the vehicle in a case in which any spatial information is not provided in advance.

The invention has been made in consideration of the above-mentioned circumstances, and an object of the invention is to provide a robot device of which movement can be always controlled on the basis of optimum spatial information about a peripheral area without the need to prepare highly accurate spatial information about an area associated with a structure in advance and a method of controlling the movement of the robot device.

In order to achieve the object, a robot device according to an aspect of the invention comprises a spatial information recording unit where first spatial information about an area in which the movement of a robot device to be self-propelled with respect to a structure is supposed and which is associated with the structure is recorded, a spatial information acquisition section that is mounted on the robot device and acquires second spatial information about a peripheral area of the robot device with the movement of the robot device, and a spatial information updating unit that updates the first spatial information recorded in the spatial information recording unit with the second spatial information acquired by the spatial information acquisition section. The first spatial information recorded in the spatial information recording unit is used in a case in which the robot device is moved with respect to the structure.

According to the aspect of the invention, the first spatial information about an area in which the movement of a robot device is supposed, which is recorded in the spatial information recording unit, is updated with the second spatial information about the peripheral area of the robot device that is acquired with the movement of the robot device by the spatial information acquisition section. Further, the first spatial information recorded in the spatial information recording unit is used in a case in which the robot device is moved with respect to the structure. Accordingly, in a case in which the first spatial information about the peripheral area of the robot device is updated at the time of movement of the robot device, the updated optimum spatial information (first spatial information) can be used. Further, even in a case in which the first spatial information about the peripheral area of the robot device is not updated, first spatial information not yet updated can be used. Further, since first spatial information, which is to be initially recorded in the spatial information recording unit, is updated with the second spatial information about the peripheral area of the robot device that is acquired by the spatial information acquisition section, the first spatial information may be approximate spatial information and highly accurate first spatial information does not need to be prepared in advance by the measurement or the like of the structure. The update of the first spatial information with the second spatial information includes the overwriting and addition of the first spatial information using the second spatial information.

Here, "the area associated with the structure" means an area in which the robot device may move and an area that can be observed by a sensor, such as a camera provided in the robot device, from the area in which the robot device may move. Further, "the peripheral area of the robot device" means an area in which the robot device can move in a short time (for example, the degree where the robot device reaches by single control of movement corresponding to about several seconds) from the position of the robot device at a certain point of time, and an area that can be observed by a sensor, such as a camera, from a place where the robot is present at a certain point of time.

According to another aspect of the invention, in the robot device, the spatial information acquisition section includes an imaging unit that takes an image of the peripheral area of the robot device, and a spatial information analysis unit that calculates the second spatial information about the peripheral area on the basis of the image taken by the imaging unit.

A compound-eye imaging unit, which can take two images (stereoscopic images) having different parallax, may be applied as the imaging unit, and a monocular imaging unit may be applied as the imaging unit. The spatial information acquisition section uses two images taken by a compound-eye imaging unit or uses a plurality of images that are taken from different viewpoint positions by the translation of the robot device in the case of a monocular imaging unit, to calculate the second spatial information about the peripheral area (for example, spatial information according to a three-dimensional shape of the structure).

According to another aspect of the invention, it is preferable that the robot device further comprises a robot-movement control unit that controls the movement of a robot body, an accessory portion attached to the robot device, and an accessory portion-movement control unit that controls the movement of the accessory portion with respect to the robot body.

According to another aspect of the invention, in the robot device, it is preferable that the robot-movement control unit controls the movement of the robot body on the basis of the first spatial information recorded in the spatial information recording unit and the accessory portion-movement control unit controls the movement of the accessory portion on the basis of the first spatial information recorded in the spatial information recording unit. Accordingly, the movement of the robot body and the movement of the accessory portion can be automatically controlled.

According to another aspect of the invention, it is preferable that the robot device further comprises a robot-operating unit that outputs a movement command for the robot body by a manual operation and an accessory portion-operating unit that outputs a movement command for the accessory portion by a manual operation, and the robot-movement control unit controls the movement of the robot body on the basis of the movement command output from the robot-operating unit and the accessory portion-movement control unit controls the movement of the accessory portion on the basis of the movement command output from the accessory portion-operating unit. Accordingly, the movement of the robot body and the movement of the accessory portion can be controlled by a manual operation.

According to another aspect of the invention, it is preferable that the robot device further comprises a robot shape grasping unit that spatially grasps the shapes of the robot body and the accessory portion as a robot shape and an interference-avoidance control section that regulates the operation of at least one of the robot-movement control unit or the accessory portion-movement control unit on the basis of the first spatial information recorded in the spatial information recording unit and the robot shape grasped by the robot shape grasping unit to avoid interference between the robot device and the structure.

The robot body and the accessory portion are moved by the robot-movement control unit and the accessory portion-movement control unit, respectively. However, the operation of at least one of the robot-movement control unit or the accessory portion-movement control unit is regulated to avoid the interference between the robot device and the structure in a case in which the interference (collision) between the robot device and the structure is expected on the basis of the first spatial information and the robot shape, which is grasped by the robot shape grasping unit, at the time of movement of the robot body and the accessory portion.

According to another aspect of the invention, in the robot device, it is preferable that the robot-movement control unit controls the movement of the robot body on the basis of the first spatial information recorded in the spatial information recording unit, the accessory portion-movement control unit controls the movement of the accessory portion on the basis of the first spatial information recorded in the spatial information recording unit, and the interference-avoidance control section includes a determination unit that determines whether or not the robot device and the structure interfere with each other in a case in which the robot body is moved by the robot-movement control unit or a case in which the accessory portion is moved by the accessory portion-movement control unit, on the basis of the first spatial information recorded in the spatial information recording unit and the robot shape grasped by the robot shape grasping unit, and an operation changing unit that changes the operation of at least one of the robot-movement control unit or the accessory portion-movement control unit to avoid interference between the robot device and the structure in a case in which the determination unit determines that the robot device and the structure interfere with each other.

In a case in which the interference (collision) between the robot device and the structure is determined (expected) at the time of movement of the robot body or the accessory portion, the operation of at least one of the robot-movement control unit or the accessory portion-movement control unit is changed. Accordingly, the interference between the robot device and the structure can be automatically avoided.

According to another aspect of the invention, it is preferable that the robot device further comprises a robot-operating unit that outputs a movement command for the robot body by a manual operation and an accessory portion-operating unit that outputs a movement command for the accessory portion by a manual operation, the robot-movement control unit controls the movement of the robot body on the basis of the movement command output from the robot-operating unit, the accessory portion-movement control unit controls the movement of the accessory portion on the basis of the movement command output from the accessory portion-operating unit, and the interference-avoidance control section includes a determination unit that determines whether or not the robot device and the structure interfere with each other in a case in which the robot body is moved according to the movement command output from the robot-operating unit or a case in which the accessory portion is moved according to the movement command output from the accessory portion-operating unit, on the basis of the first spatial information recorded in the spatial information recording unit and the robot shape grasped by the robot shape grasping unit, and an information unit that stops the operation of at least one of the robot-movement control unit or the accessory portion-movement control unit and issues a warning in a case in which the determination unit determines that the robot device and the structure interfere with each other.

In a case in which the interference (collision) between the robot device and the structure is determined (expected) at the time of movement of the robot body or the accessory portion caused by a manual operation, the operation of at least one of the robot-movement control unit or the accessory portion-movement control unit is stopped and a warning is issued. Accordingly, an operator can perform an operation for avoiding the interference between the robot device and the structure.

According to another aspect of the invention, in the robot device, it is preferable that the accessory portion includes an inspection data sensing section that inspects the structure.

According to another aspect of the invention, in the robot device, it is preferable that the inspection data sensing section includes at least one of a static image pickup unit, a hammering test unit, or an ultrasonic test unit.

According to another aspect of the invention, it is preferable that the robot device further comprises an inspection data recording unit that records inspection data, detected by the inspection data sensing section, in association with an inspected portion of the structure.

A method of controlling the movement of a robot device according to another aspect of the invention comprises: a step of recording approximate spatial information about an area, in which the movement of a robot device to be self-propelled with respect to a structure is supposed and which is associated with the structure, in a spatial information recording unit as first spatial information; a step of acquiring second spatial information about a peripheral area of the robot device with the movement of the robot device by a spatial information acquisition section mounted on the robot device; and a step of updating the first spatial information recorded in the spatial information recording unit with the acquired second spatial information by a spatial information updating unit. The first spatial information recorded in the spatial information recording unit is used in a case in which the robot device is moved with respect to the structure.

According to the invention, the movement of a robot device can be always controlled on the basis of optimum spatial information about a peripheral area without the need to prepare highly accurate spatial information about an area associated with a structure in advance.

DESCRIPTION OF THE PREFERRED EMBODIMENTS

Embodiments a robot device and a method of controlling the movement of the robot device according to the invention will be described below with reference to accompanying drawings.

[Structure of Bridge]

Figure 1:
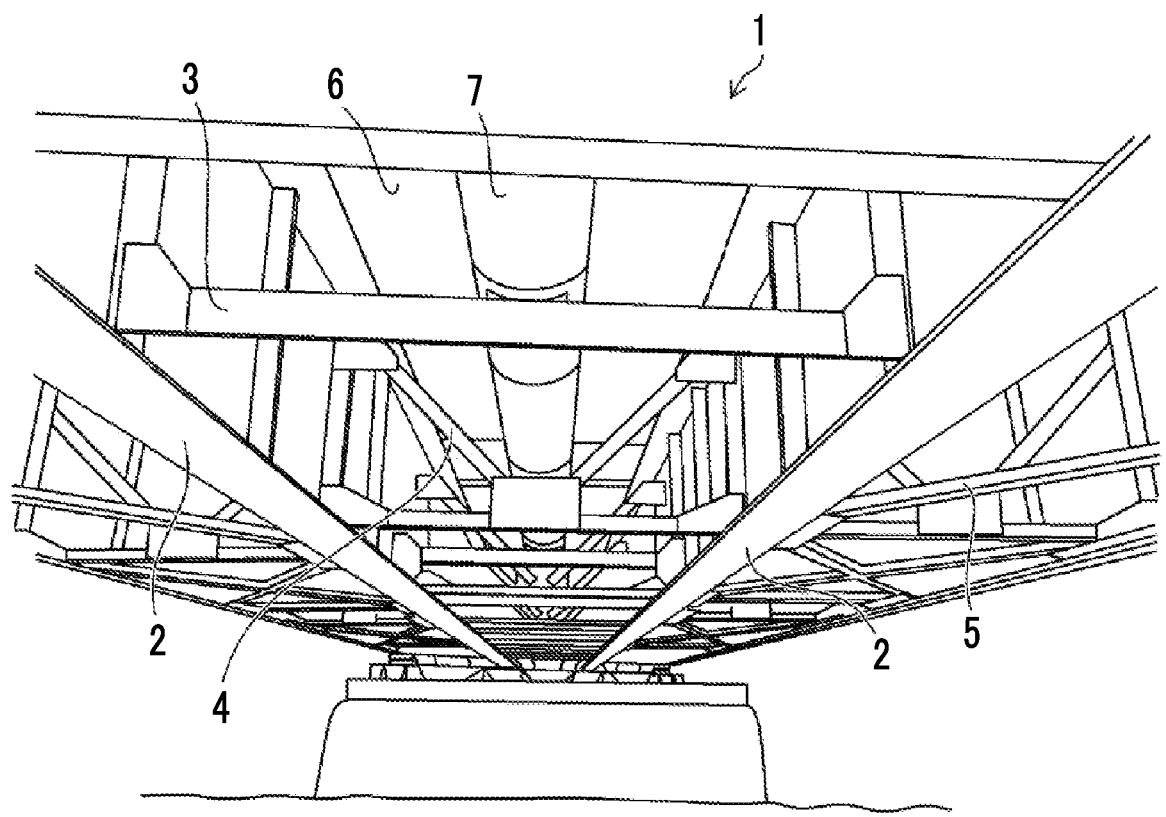
FIG. 1 is a diagram showing the appearance of a bridge seen from the lower surface side.

FIG. 1 is a perspective view showing the structure of a bridge that is one of a structure to which inspection or sensing using the robot device according to the invention is applied, and is a perspective view of the bridge seen from below.

The bridge 1 shown in FIG. 1 includes main girders 2, cross beams 3, cross frames 4, and lateral frames 5; and the main girders 2, the cross beams 3, the cross frames 4, and the lateral frames 5 are connected to each other by bolts, rivets, or welding. Further, floor slabs 6 on which vehicles and the like travel are installed on the main girders 2 and the like. The floor slabs 6 are generally made of reinforced concrete.

The main girder 2 is a member that is provided between abutments or piers and supports the load of vehicles and the like that are positioned on the floor slab 6. The cross beam 3 is a member that connects the main girders 2 to support a load by the plurality of main girders 2. The cross frame 4 and the lateral frame 5 are members that connect the main girders 2 to resist a lateral load of wind, earthquake, or the like. Further, pipes 7 are provided below the bridge 1 of this example.

[Appearance of Robot Device]

Figure 2:
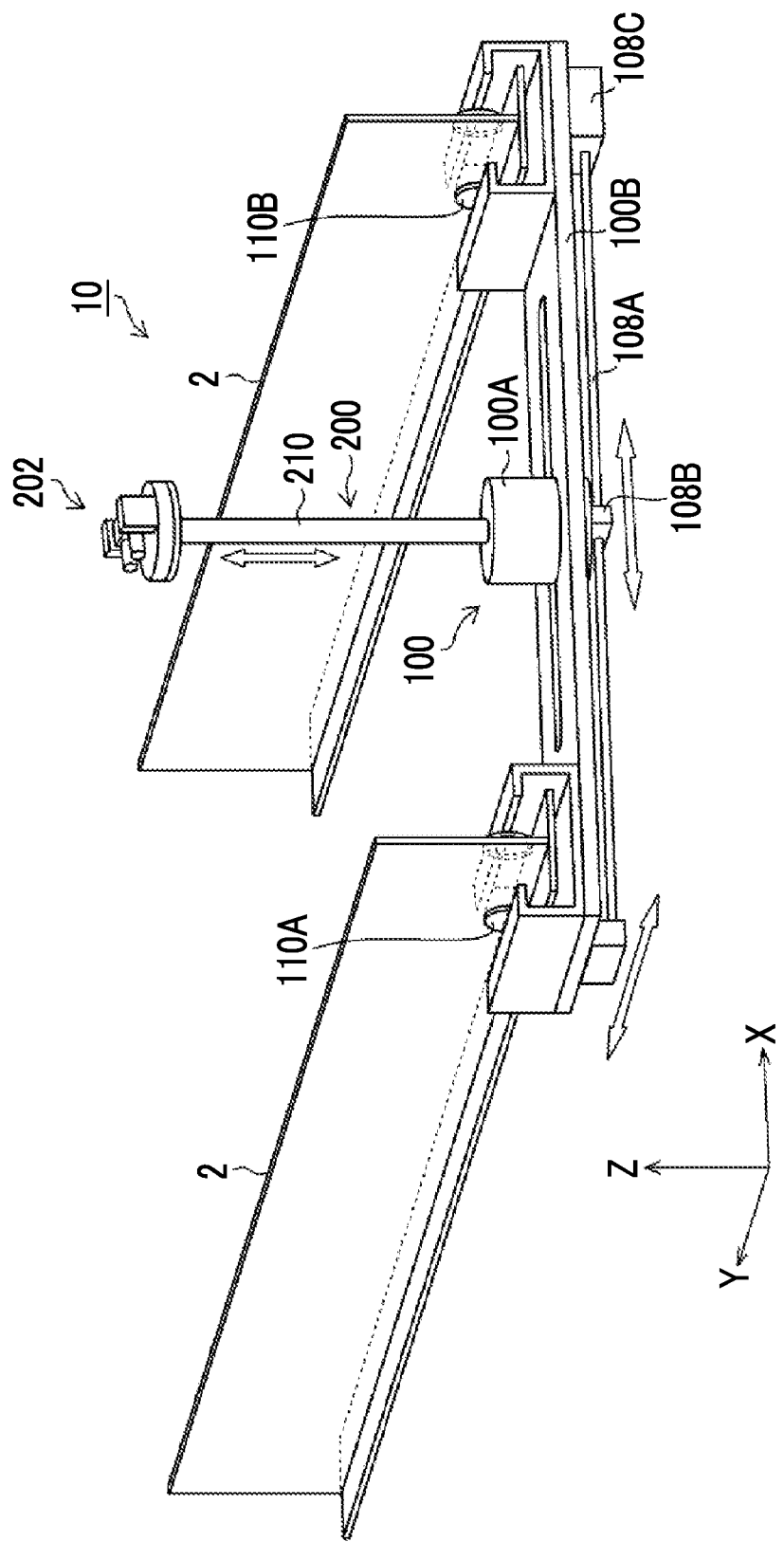
FIG. 2 is a perspective view showing the appearance of a robot device that is installed at a lower portion of the bridge.

FIG. 2 is a perspective view showing the appearance of the robot device according to the invention, and shows a state in which the robot device is installed between the main girders 2 of the bridge 1. Further, FIG. 3 is a cross-sectional view of main parts of the robot device shown in FIG. 2.

Figure 3:
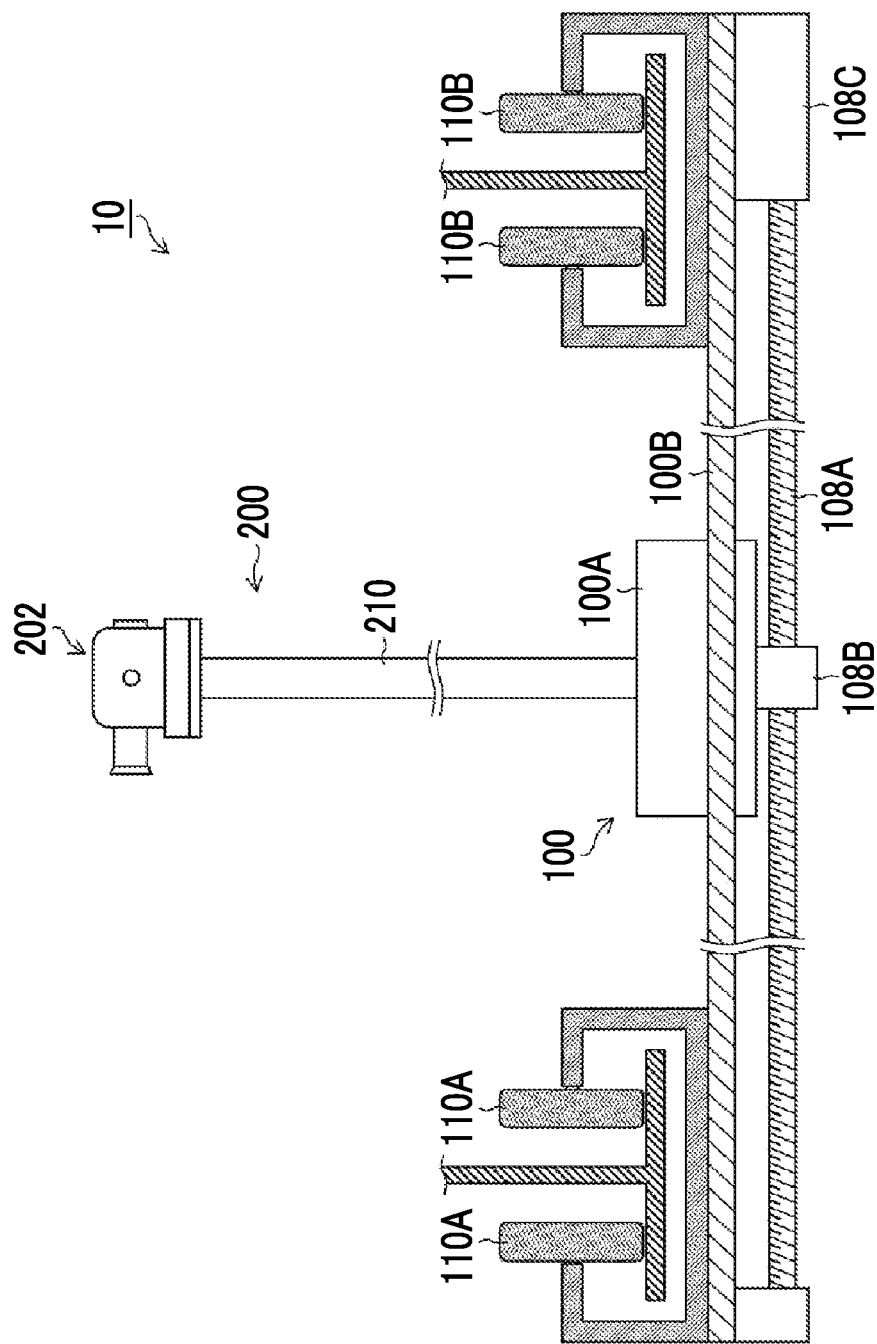
FIG. 3 is a cross-sectional view of main parts of the robot device.

As shown in FIGS. 2 and 3, the robot device 10 mainly includes a robot body 100 and an accessory portion 200 that is attached to the robot device 10.

Although described in detail below, the robot body 100 includes a main frame 100B, a housing 100A in which drive units, various control units, and the like of the accessory portion 200 are provided, an X-direction drive unit 108 (FIG. 5) that moves the housing 100A in a longitudinal direction of the main frame 100B (a direction orthogonal to the longitudinal direction of the main girder 2) (X direction), a Y-direction drive unit 110 (FIG. 5) that moves the entire robot device 10 in the longitudinal direction of the main girder 2 (Y direction), and a Z-direction drive unit 112 (FIG. 5) that elongates and contracts a vertical telescopic arm 210 of the accessory portion 200 in a vertical direction (Z direction).

The X-direction drive unit 108 includes a ball screw 108A that is provided in the longitudinal direction of the main frame 100B (X direction), a ball nut 108B that is provided in the housing 100A, and a motor 108C that rotates the ball screw 108A; and rotates the ball screw 108A in a normal direction or a reverse direction by the motor 108C to move the housing 100A in the X direction.

The Y-direction drive unit 110 includes tires 110A and 110B that are provided at both ends of the main frame 100B and motors (not shown) that are provided in the tires 110A and 110B, and drives the tires 110A and 110B by the motors to move the entire robot device 10 in the Y direction.

The robot device 10 is installed in an aspect in which the tires 110A and 110B provided at both ends of the main frame 100B are placed on lower flanges of the two main girders 2 and are disposed so that each of the main girders 2 is positioned between the tires 110A and 110B. Accordingly, the robot device 10 is suspended from the lower flanges of the main girders 2 and can be moved (self-propelled) along the main girders 2. Further, although not shown, the main frame 100B is adapted so that the length of the main frame 100B can be adjusted in accordance with an interval between the main girders 2.

The accessory portion 200 includes the vertical telescopic arm 210 and an imaging section 202 that functions as one of a part of a spatial information acquisition section and an inspection data sensing section.

Since the vertical telescopic arm 210 of the accessory portion 200 is provided in the housing 100A of the robot body 100, the accessory portion 200 is moved in the X direction and the Y direction together with the housing 100A.

Further, the vertical telescopic arm 210 is elongated and contracted in the Z direction by the Z-direction drive unit 112 (FIG. 5) that is provided in the housing 100A.

Figure 4:
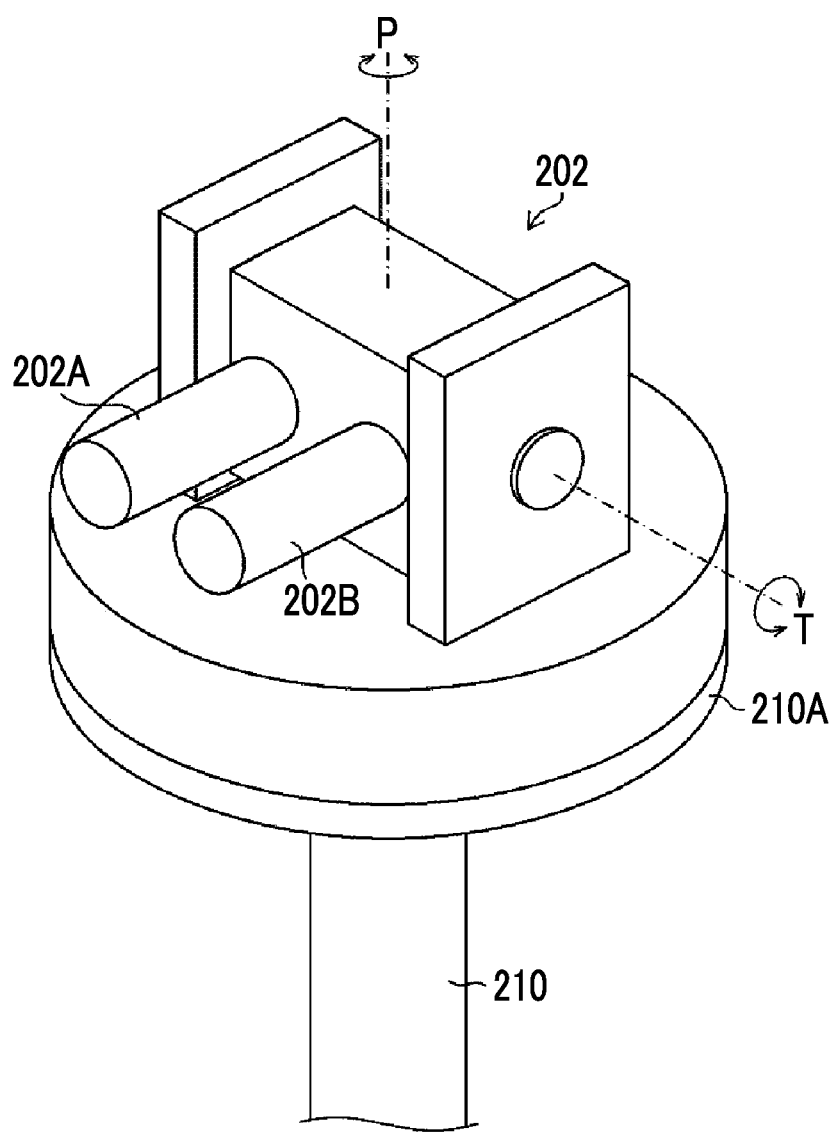
FIG. 4 is a perspective view showing the appearance of an imaging section.

A camera installation part 210A is provided at the end of the vertical telescopic arm 210 as shown in FIG. 4, and the imaging section 202, which can be panned and tilted, is installed on the camera installation part 210A.

The imaging section 202 includes a first imaging unit 202A and a second imaging unit 202B, and can take two images (stereoscopic images) having different parallax by the first imaging unit 202A and the second imaging unit 202B. The stereoscopic image may be any one of a video and a static image. Further, in this example, the first imaging unit 202A is also used as a static image pickup unit that takes a static image for inspection.

Figure 5:
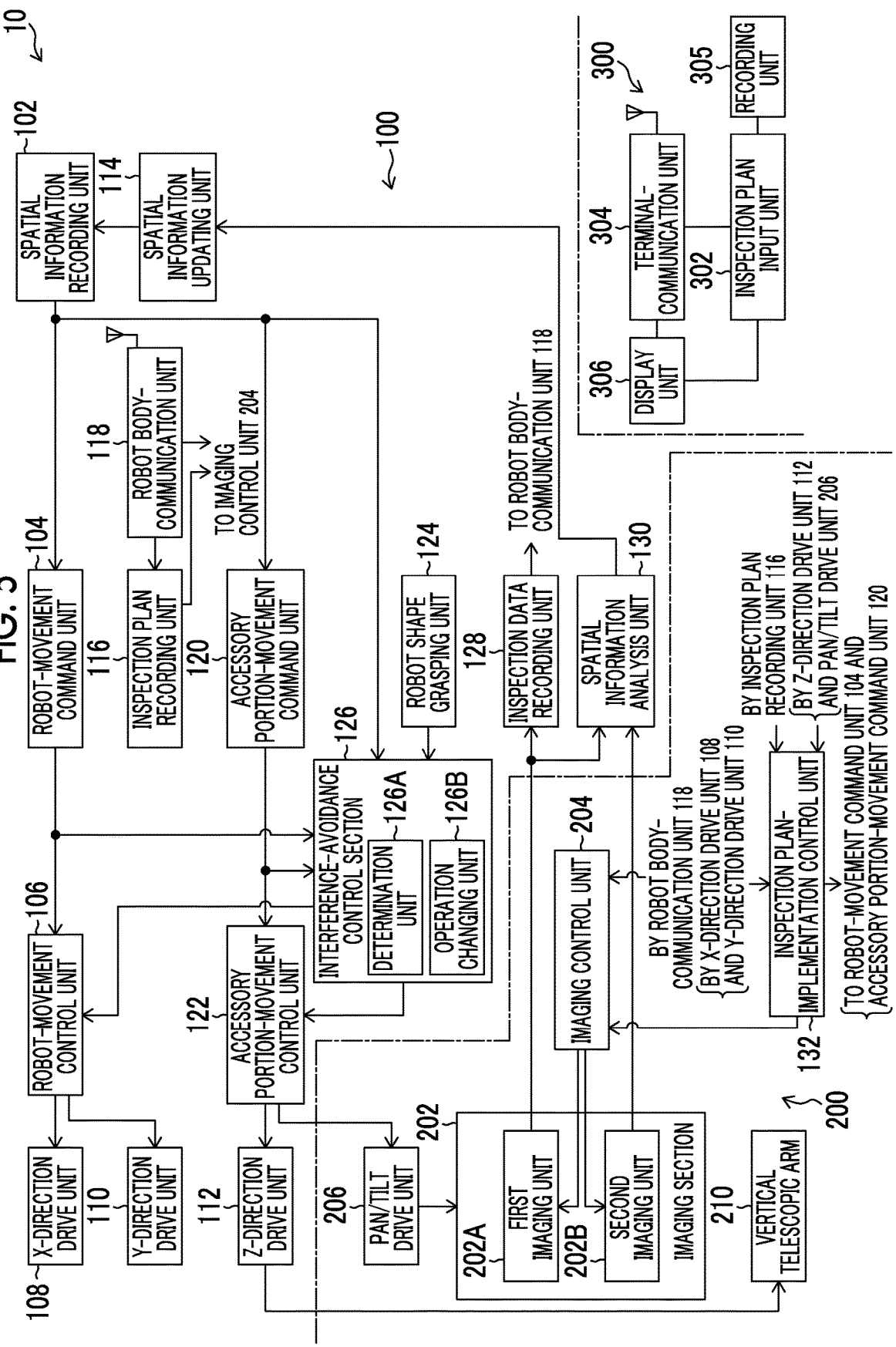
FIG. 5 is a block diagram showing the configuration of a robot device according to a first embodiment.

The imaging section 202 is rotated about a pan axis P coaxial with the vertical telescopic arm 210 or is rotated about a tilt axis T parallel to a horizontal direction by a pan/tilt drive unit 206 (FIG. 5). Accordingly, the imaging section 202 can take an image in an arbitrary posture (take an image in an arbitrary imaging direction).

First Embodiment

<Configuration of Robot Device>

First, a first embodiment of the robot device 10 of the invention and a method of controlling the movement thereof will be described below. In the first embodiment, the robot device 10 automatically (without an operator's operation) performs the update of spatial information (first spatial information) about an area associated with the bridge 1 (structure), the avoidance of interference between the robot device 10 and the bridge 1 at the time of movement of the robot device 10, and the acquisition of inspection data in accordance with a preset inspection plan. Specific examples of the area associated with the bridge 1 (structure) include the area in a building to be cleaned in the case of a robot device of which a main object is to perform cleaning and the entire area of the bridge 1 in the case of the robot device 10 of which a main object is to inspect the bridge 1.

FIG. 5 is a block diagram showing the configuration of the robot device 10 according to the first embodiment. As shown in FIG. 5, the robot device 10 according to this embodiment includes the robot body 100 that includes various control units, recording units, and the like, the accessory portion 200 that is attached to the robot body 100 and acquires spatial information or images for inspection data, and a terminal 300 that is used to input an inspection plan, to display various kinds of information, and the like.

<Configuration of Robot Body>

First, the configuration of the robot body 100 and the summary of processing performed by the robot body 100 will be described.

<Movement in X and Y Directions Based on Spatial Information>

At the time of start of inspection performed by the robot device 10, for example, an inspection plan input through the terminal 300 is recorded in an inspection plan recording unit 116, and spatial information about the area associated with the bridge 1 (structure) (first spatial information recorded in advance or second spatial information obtained after update) is recorded in a spatial information recording unit 102. Further, a robot-movement command unit 104 outputs a movement command for moving the robot device 10 on the basis of the inspection plan and approximate spatial information, and a robot-movement control unit 106 controls the X-direction drive unit 108 and the Y-direction drive unit 110 on the basis of the movement command to control the movement of the robot body 100 in the X direction and the Y direction (see FIG. 2).

<Elongation and Contraction of Vertical Telescopic Arm and Pan and Tilt of Imaging Section>

An accessory portion-movement command unit 120 outputs a movement command for elongating and contracting the vertical telescopic arm 210 provided in the accessory portion 200 on the basis of the inspection plan recorded in the inspection plan recording unit 116 and the spatial information recorded in the spatial information recording unit 102, and an accessory portion-movement control unit 122 controls the Z-direction drive unit 112 on the basis of the movement command to elongate and contract the vertical telescopic arm 210 in the Z direction. Further, the accessory portion-movement control unit 122 pans and tilts the imaging section 202 in a desired direction through the pan/tilt drive unit 206 of the accessory portion 200 (see FIG. 4).

<Update of Spatial Information>

At the time of start of inspection, approximate spatial information (first spatial information) about an area associated with the bridge 1 is recorded in the spatial information recording unit 102 in advance. In the robot device 10, the image data of stereoscopic images acquired by the imaging section 202 (spatial information acquisition section) are input to a spatial information analysis unit 130, detailed spatial information (second spatial information) about the peripheral area of the robot device 10 is calculated by the spatial information analysis unit 130, and a spatial information updating unit 114 sequentially updates the first spatial information by using the calculated second spatial information. That is, the imaging section 202 and the spatial information analysis unit 130 form a spatial information acquisition section of the invention. The detail of spatial information updating processing will be described later. Specifically, the peripheral area is an area corresponding to a range which is within about several meters around the robot device 10 and in which peripheral structure can be grasped by one-time imaging. Specific examples of the peripheral area include an area corresponding to a range that is viewed at a certain point of time (a room that is being cleaned now, or the like) in the case of a robot device of which a main object is to perform cleaning and an area corresponding to a range of about several meters between panels (in a trave) to be inspected at a certain point of time in the case of the robot device 10 of which a main object is to inspect the bridge 1.

<Implementation Control of Inspection Plan>

An inspection plan-implementation control unit 132 controls an imaging control unit 204 on the basis of the position information (the value of an encoder or the like) of the robot device 10 input from the X-direction drive unit 108 and the Y-direction drive unit 110, the shape or posture (the length of the vertical telescopic arm 210, the orientation of the imaging section 202, and the like) of the accessory portion input from the Z-direction drive unit 112 and the pan/tilt drive unit 206, and the inspection plan recorded in the inspection plan recording unit 116 to acquire inspection data (the static images of the bridge 1 and accessories thereof) in a predetermined inspection position or a predetermined imaging posture by the first imaging unit 202A. That is, the second imaging unit 202B forms a static image pickup section and the inspection data sensing section of the invention. In the invention, a hammering test unit or an ultrasonic test unit may be provided as the inspection data sensing section. The position information may be acquired by a global positioning system (GPS).

In a case in which the acquisition of the inspection data ends, the inspection plan-implementation control unit 132 outputs information about the end of the acquisition of the inspection data to the robot-movement command unit 104 and the accessory portion-movement command unit 120. Accordingly, the robot device 10 is moved to a new location and takes images at the new location. This procedure is repeated until the end of the inspection plan.

<Avoidance of Interference Between Robot Device and Structure>

In a case in which the robot device 10 is moved in the X direction and the Y direction and elongates and contracts the vertical telescopic arm 210 in the Z direction and interferes with the bridge 1 (structure), an interference-avoidance control section 126 regulates the operation of at least one of the robot-movement control unit 106 or the accessory portion-movement control unit 122 to avoid the interference between the robot device 10 and the bridge 1. The interference-avoidance control section 126 includes a determination unit 126A that determines whether or not the robot device 10 and the bridge 1 interfere with each other on the basis of the spatial information recorded in the spatial information recording unit 102 and the shapes of the robot body 100 and the accessory portion 200 spatially grasped by a robot shape grasping unit 124, and an operation changing unit 126B that automatically regulates or changes the operation of at least one of the robot-movement control unit 106 or the accessory portion-movement control unit 122 to avoid the interference between the robot device 10 and the bridge 1 in a case in which it is determined that the robot device 10 and the bridge 1 interfere with each other.

The robot shape grasping unit 124 can grasp the shapes of the robot body 100 and the accessory portion 200 from the shapes, positions, and postures of the robot body 100 and the accessory portion 200, the driving distance of the robot device driven by the robot-movement control unit 106 and the accessory portion-movement control unit 122, and the degree of pan and tilt at the time of start of movement or inspection. The detail of an interference-avoidance procedure will be described later.

<Configuration of Accessory Portion>

The accessory portion 200 includes the imaging section 202, the imaging control unit 204, the pan/tilt drive unit 206, and the vertical telescopic arm 210. The imaging section 202 includes the first imaging unit 202A and the second imaging unit 202B, and is provided at the end portion of the vertical telescopic arm 210.

<Taking of Stereoscopic Image>

The robot device 10 takes stereoscopic images around the robot device 10 by the first imaging unit 202A and the second imaging unit 202B while moving along the bridge 1. As described above, the detailed spatial information (second spatial information) about the peripheral area of the robot device 10 is calculated on the basis of the image data of the stereoscopic images taken in this way and the approximate spatial information is updated on the basis of the calculated detailed spatial information.

<Acquisition of Images for Inspection Data>

Further, the imaging section 202 acquires the image of a desired portion of the bridge 1 by the first imaging unit 202A to inspect the desired portion of the bridge 1. That is, the first imaging unit 202A forms the inspection data sensing section of the invention. The image data of the acquired image are input to an inspection data recording unit 128 of the robot body 100, and is recorded in association with an inspected portion. The data, which are recorded in this way, are appropriately transmitted to the terminal 300 through a robot body-communication unit 118, and are recorded in a recording unit 305.

The analysis of data, which are acquired or recorded in this way, (the grasp of the degraded state of the bridge 1, the detection of an abnormal portion of the bridge 1, and the like) can be performed by the terminal 300.

<Spatial Information>

In this embodiment, approximate three-dimensional shape data, which are acquired or set in advance (before inspection), can be used as the "first spatial information" about a structure (bridge 1). The shape data may include approximate three-dimensional data of shapes or dimensions of the bridge 1 and the accessories thereof. Specifically, the shape data can include, for example, a distance between the floor slab and the lower flange, the shapes, positions, and intervals of the main girders 2, the cross beams 3, the cross frames 4, the lateral frames 5, and the like, and the positions, diameters, lengths, and the like of the pipes disposed below the floor slab; and can also include the positions of these elements that are based on a specific position of the bridge 1. The shape data can be set by a design drawing, rough computer aided design (CAD) data, visual observation, and the like. The "first spatial information" has only to be approximate three-dimensional shape data, and may not be as highly accurate as the "second spatial information" to be described below.

The first spatial information is used as the initial information of the shape data of the bridge 1 in a case in which the robot device 10 is to move with respect to the bridge 1 or is to acquire inspection data.

The "second spatial information" is detailed three-dimensional shape data of the bridge 1 and the accessories thereof that are obtained in a case in which image data actually acquired by the imaging section 202 are analyzed by the spatial information analysis unit 130.

A case in which the first spatial information is sequentially updated with the second spatial information as the robot device 10 is moved will be described (described later) in this embodiment, but the second spatial information is acquired as separate spatial information without the sequential update of the first spatial information and may be updated later by automatic processing or a manual operation.

<Configuration of Terminal>
<Input and Transmission of Inspection Plan>

The terminal 300 is a terminal unit that is used to perform the creation, input, and recording of various data, the display of inspection data, and the like; and a personal computer, a tablet terminal, a smartphone, various personal digital assistants (PDAs), and the like can be used as the terminal 300. In the first embodiment, an inspection plan for the bridge 1 is input through an inspection plan input unit 302 of the terminal 300. The input inspection plan is wirelessly transmitted to the robot body-communication unit 118 of the robot body 100 through a terminal-communication unit 304, is recorded in the inspection plan recording unit 116, and is recorded in the recording unit 305 provided in the terminal 300. Preparation required before inspection will be described later.

<Receipt, Display, and Recording of Inspection Data>

Further, the terminal-communication unit 304 receives inspection data from the robot body-communication unit 118. The received inspection data are displayed on a display unit 306 and are recorded in the recording unit 305.

Next, a case in which the inspection of the structure (bridge 1) is performed using the robot device 10 will be described. Since the terminal 300, which is a part of the robot device 10, is wirelessly connected to the robot device 10 to be described below, only a part of the robot device 10 except for the terminal 300 is installed on a structure.

Figure 6:
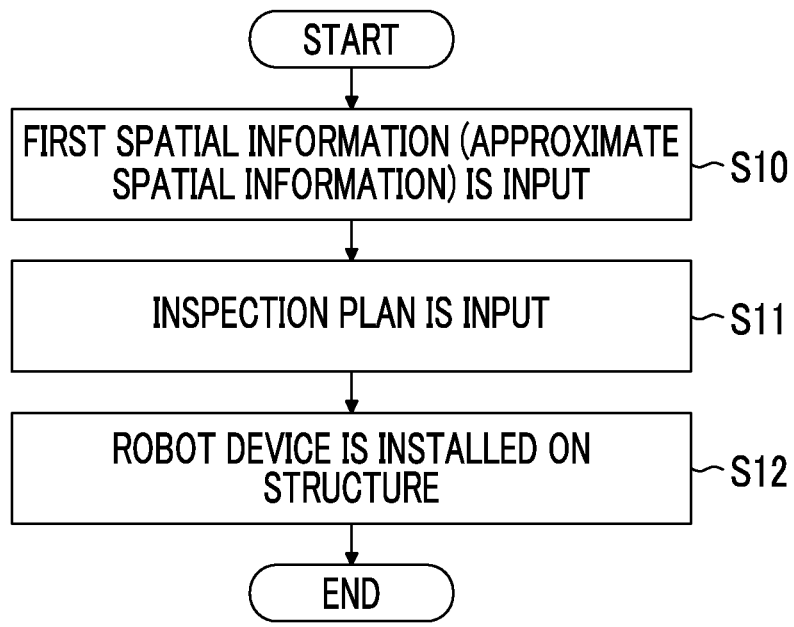
FIG. 6 is a flow chart showing a procedure of inspection preparation of a first embodiment.

FIG. 6 is a flow chart showing a procedure of a preparation step before the inspection of a structure. First, the first spatial information (approximate spatial information) is input to the spatial information recording unit 102 (Step S10). The input of the approximate spatial information is performed manually or automatically. In a case in which the input of the approximate spatial information is performed manually, for example, the approximate spatial information may be input through the terminal 300 by an operator or may be directly input to the robot device 10. In a case in which approximate spatial information about a structure as an object to be tested is provided in the spatial information recording unit 102 in advance, a step of inputting the approximate spatial information may be omitted. Here, for example, the approximate spatial information is the drawing data of a bridge as a structure, the length of the bridge, the number of cross beams, or an installation interval of the cross beams. The approximate spatial information is not particularly limited, is information enough to approximately grasp the shape of a structure in an area where the movement of at least the robot device 10 is supposed, and means information that can be used for an initial operation of the robot device 10.

Next, an inspection plan is input to the inspection plan recording unit 116 (Step S11). The input of the inspection plan is also performed manually or automatically as in the case of the approximate spatial information. In a case in which the input of the inspection plan is performed manually, for example, the inspection plan may be input through the terminal 300 by an operator or may be directly input to the robot device 10. There is a case where the inspection plan is provided in the inspection plan recording unit 116 in advance in a certain robot device 10, and a step of inputting the inspection plan may be omitted in that case. The inspection plan includes a movement plan for the robot device 10, the positions of points where inspection image data are acquired (inspected portions), the number of the points where inspection image data are acquired, or the like. Further, inspection performed by the robot device 10 to be described later is basically performed according to an inspection plan, but inspection image data of a point not included in the inspection plan may be acquired. For example, the inspection image data of a point not included in the inspection plan may be acquired by an operator's manual operation.

Next, the robot device 10 is installed on a structure (Step S12). Reference points of a coordinate system for spatial information are set by the installation of the robot device on the structure. That is, in a case in which the robot device 10 is installed on the structure, the initialization of a coordinate system in the robot device 10 is performed.

In a case in which the approximate spatial information is input to the spatial information recording unit 102, the inspection plan is input to the inspection plan recording unit 116, and the robot device 10 is installed on the structure as described above, the preparation for inspection is completed.

Figure 7:
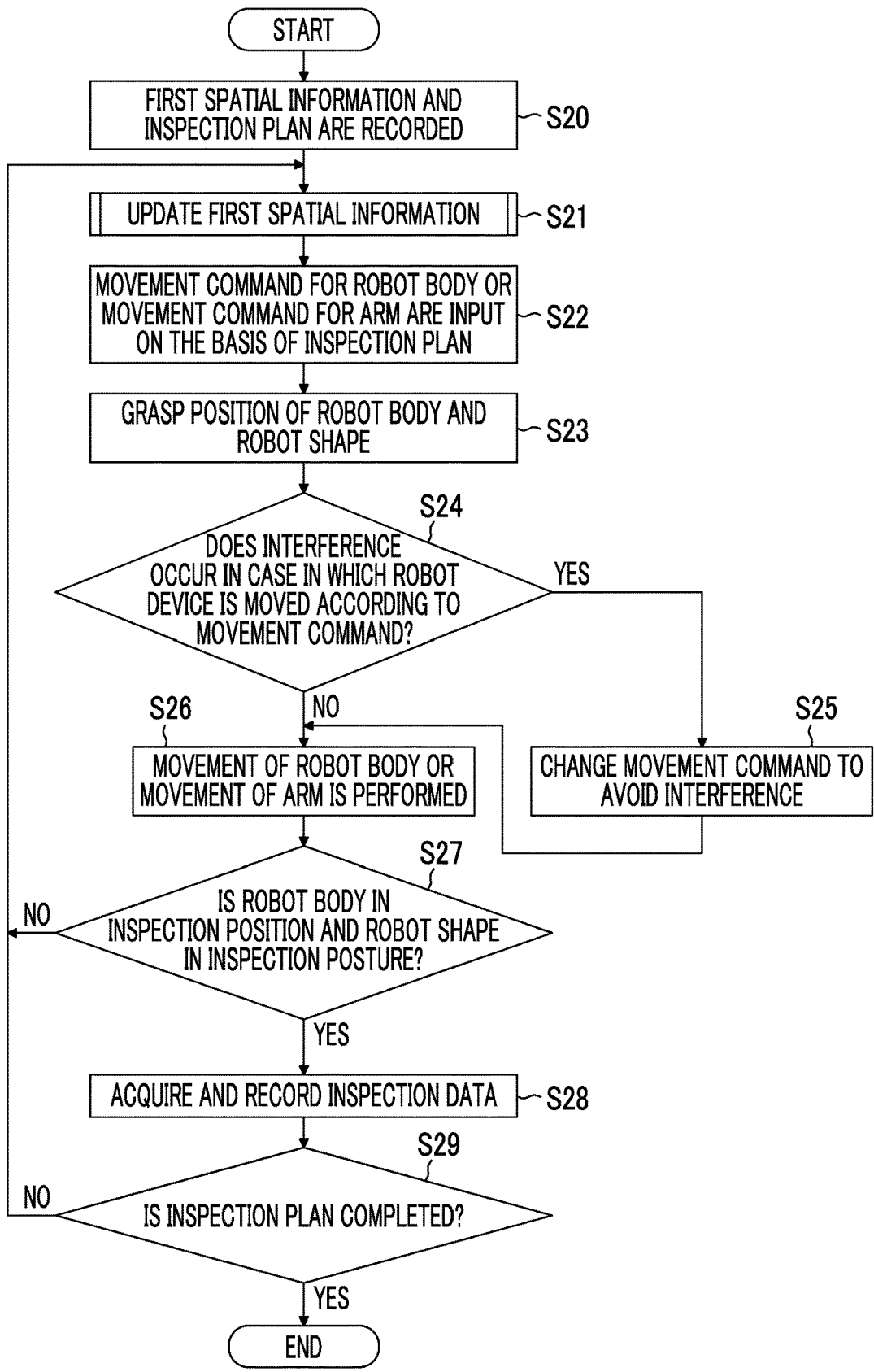
FIG. 7 is a flow chart showing processing of inspection work of the first embodiment.

FIG. 7 is a flow chart showing a case in which the inspection of a structure is automatically performed. The automatic inspection of the structure means that the robot device 10 is automatically controlled to inspect the structure according to an inspection plan.

First, as described in FIG. 6, in the preparation step, the first spatial information (approximate spatial information) is recorded in the spatial information recording unit 102 and the inspection plan is recorded in the inspection plan recording unit 116 (Step S20). Then, the first spatial information is updated by the spatial information updating unit 114 (Step S21).

Figure 8:
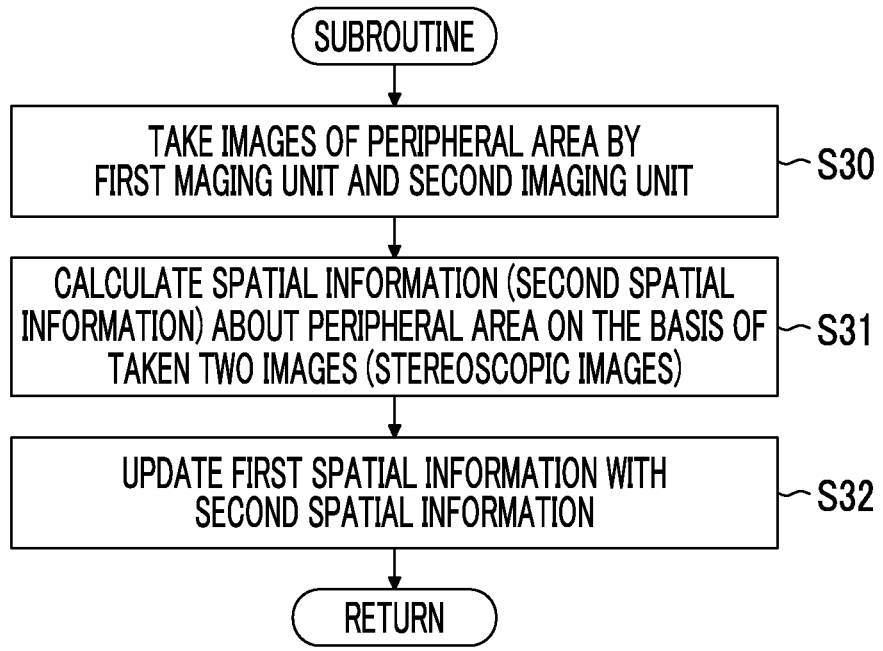
FIG. 8 is a flow chart showing processing for updating first spatial information.

FIG. 8 is a flow chart showing a subroutine of processing for updating the first spatial information that is performed by the spatial information updating unit 114.

First, the imaging section 202 (the first and second imaging units 202A and 202B) controlled by the imaging control unit 204 images the peripheral area of the robot device 10 (Step S30). Imaging performed by the imaging section 202 is to take a video (also including a live-view image) or a static image. Here, the peripheral area is not particularly limited, and means, for example, the peripheral area of the robot device 10 that can be appropriately imaged by the first and second imaging units 202A and 202B.

Images (image data), which are taken by the first and second imaging units 202A and 202B, are input to the spatial information analysis unit 130. Then, the spatial information analysis unit 130 calculates spatial information (second spatial information) about the peripheral area on the basis of the two images (stereoscopic images) that are taken by the first and second imaging units 202A and 202B (Step S31). For example, the spatial information analysis unit 130 acquires the spatial coordinates of the structure by the two images (stereoscopic images) that are taken by the first and second imaging units 202A and 202B. The spatial coordinates of the structure are, for example, spatial coordinates about the shape of the structure and the spatial coordinates of a structure that become an obstacle to an operation of the inspection work of the robot device 10.

Further, the taking of the images of the peripheral area, which is performed by the first and second imaging units 202A and 202B, and the calculation of the second spatial information, which is performed by the spatial information analysis unit 130, may be performed multiple times to improve the accuracy of the second spatial information. For example, in a case in which a difference (for example, 5 mm or more) larger than a predetermined value is present as the result of the comparison of the first spatial information and the second spatial information, the peripheral area may be imaged by the first and second imaging units 202A and 202B again and second spatial information may be calculated by the spatial information analysis unit 130 again.

Then, the second spatial information, which is calculated by the spatial information analysis unit 130, is input to the spatial information updating unit 114, and the spatial information updating unit 114 updates the first spatial information, which is recorded in the spatial information recording unit 102, with the second spatial information (Step S32). Update mentioned here means the replacement of, for example, first spatial information with corresponding second spatial information, and means the replacement of, for example, spatial coordinates serving as the first spatial information with spatial coordinates serving as the second spatial information.

An aspect in which the first spatial information is sequentially updated with the acquired second spatial information has been described in the above-mentioned embodiment, but the invention is not limited thereto. For example, the first spatial information and the second spatial information may be separately recorded in the robot device 10, and the first spatial information updated on the basis of the second spatial information may be separately recorded. In this case, for example, the robot device 10 can be moved on the basis of the second spatial information after the end of the inspection plan. Further, for example, the stereoscopic display of the structure based on the first spatial information and the stereoscopic display of the structure based on the second spatial information may be superimposed and displayed on the display unit 306 of the terminal 300 so that a difference between the two stereoscopic displays becomes clear, and only a portion where a difference between the two stereoscopic displays is present may be partially updated by the selection of an operator.

Returning to FIG. 7, in a case in which the first spatial information is updated (Step S21) as described in FIG. 8, a movement command for the robot body 100 is input to the robot-movement control unit 106 from the robot-movement command unit 104 (Step S22). The robot-movement command unit 104 outputs the movement command for the robot body 100 on the basis of information about the inspection plan that is acquired from the inspection plan recording unit 116, and a movement command for the vertical telescopic arm is input to the accessory portion-movement control unit 122 from the accessory portion-movement command unit 120. Further, the accessory portion-movement command unit 120 outputs a movement command for the accessory portion 200 on the basis of information about the inspection plan that is acquired from the inspection plan recording unit 116. Furthermore, the movement command for the robot body 100 and the movement command for the accessory portion 200 are also input to the interference-avoidance control section 126.

Further, the robot shape grasping unit 124 grasps the position of the robot body 100 and the shape of the accessory portion 200 on the basis of information that is acquired from the X-direction drive unit 108, the Y-direction drive unit 110, and the Z-direction drive unit 112 (Step S23).

After that, the determination unit 126A of the interference-avoidance control section 126 determines whether or not the robot device 10 and the structure interfere with each other on the basis of the robot shape grasped by the robot shape grasping unit 124, the movement commands (the movement command for the robot body 100 and the movement command for the accessory portion 200), and the first spatial information transmitted from the spatial information recording unit 102 (Step S24). For example, the determination unit 126A can determine whether or not the robot device 10 and the structure interfere with each other by predicting spatial coordinates to which the robot device 10 is to be moved in consideration of the robot shape and the movement commands and comparing the spatial coordinates with the spatial coordinates corresponding to the first spatial information. If the determination unit 126A determines that the robot device 10 interferes with the structure (YES in Step S24), the operation changing unit 126B changes the movement command so as to avoid the interference between the robot device 10 and the structure (Step S25). Then, the movement of the robot body 100 is performed by the robot-movement control unit 106 or the movement of the accessory portion 200 is performed by the accessory portion-movement control unit 122 (Step S26).

On the other hand, if the determination unit 126A determines that the robot device 10 does not interfere with the structure (NO in Step S24), the movement of the robot body 100 is performed according to a movement command for the robot body 100, which is based on the inspection plan, by the robot-movement control unit 106 and the movement of the accessory portion 200 is performed according to a movement command for the accessory portion 200, which is based on the inspection plan, by the accessory portion-movement control unit 122 (Step S26). Specifically, the movement command for the robot body 100, which is input from the robot-movement command unit 104, is input to the robot-movement control unit 106, so that the X-direction drive unit 108 and the Y-direction drive unit 110 are driven. Further, the Z-direction drive unit 112 is driven through the accessory portion-movement control unit 122 according to the movement command that is input to the accessory portion-movement command unit 120.

Then, the inspection plan-implementation control unit 132 acquires information about the position of the robot body 100 from the X-direction drive unit 108 and the Y-direction drive unit 110, acquires information about the shapes of the accessory portion 200 and the imaging section 202 from the Z-direction drive unit 112 and the pan/tilt drive unit 206, and determines whether or not the robot body 100 is in an inspection position and the robot shape is in an inspection posture (Step S27). If the robot body 100 is not in the inspection position or the robot shape is not in the inspection posture (NO in Step S27), a subroutine for updating the first spatial information is performed again (Step S21). On the other hand, if the robot body 100 is in the inspection position and the robot shape is in the inspection posture (YES in Step S27), the inspection plan-implementation control unit 132 outputs a command for acquiring inspection data to the imaging control unit 204. Then, an inspection image (inspection data) is acquired by the first imaging unit 202A.

After that, the inspection plan-implementation control unit 132 determines whether or not the inspection plan is completed by the inspection data recording unit 128. If the inspection plan is not completed (No in Step S29), a subroutine for updating the first spatial information is performed again (Step S21). On the other hand, if it is determined that the inspection plan is completed by the inspection data recording unit 128 (YES in Step S29), a command for ending inspection is output to the robot-movement command unit 104 and the accessory portion-movement command unit 120.

Each configuration and function having been described above can be appropriately realized by arbitrary hardware, arbitrary software, or a combination of both arbitrary hardware and arbitrary software. For example, the invention can also be applied to a program that makes a computer perform the above-mentioned processing steps (processing procedure), a computer-readable recording medium (non-transitory recording medium) in which such a program is recorded, or a computer in which such a program can be installed.

Second Embodiment

Next, a second embodiment of a robot device 11 of the invention and a method of controlling the movement thereof will be described below. In the second embodiment, the update of approximate spatial information (first spatial information), the avoidance of interference between the robot device 11 and a bridge 1 (structure) at the time of movement of the robot device 11, and the acquisition of inspection data are performed on the basis of an operator's operation.

<Configuration of Robot Device>

Figure 9:
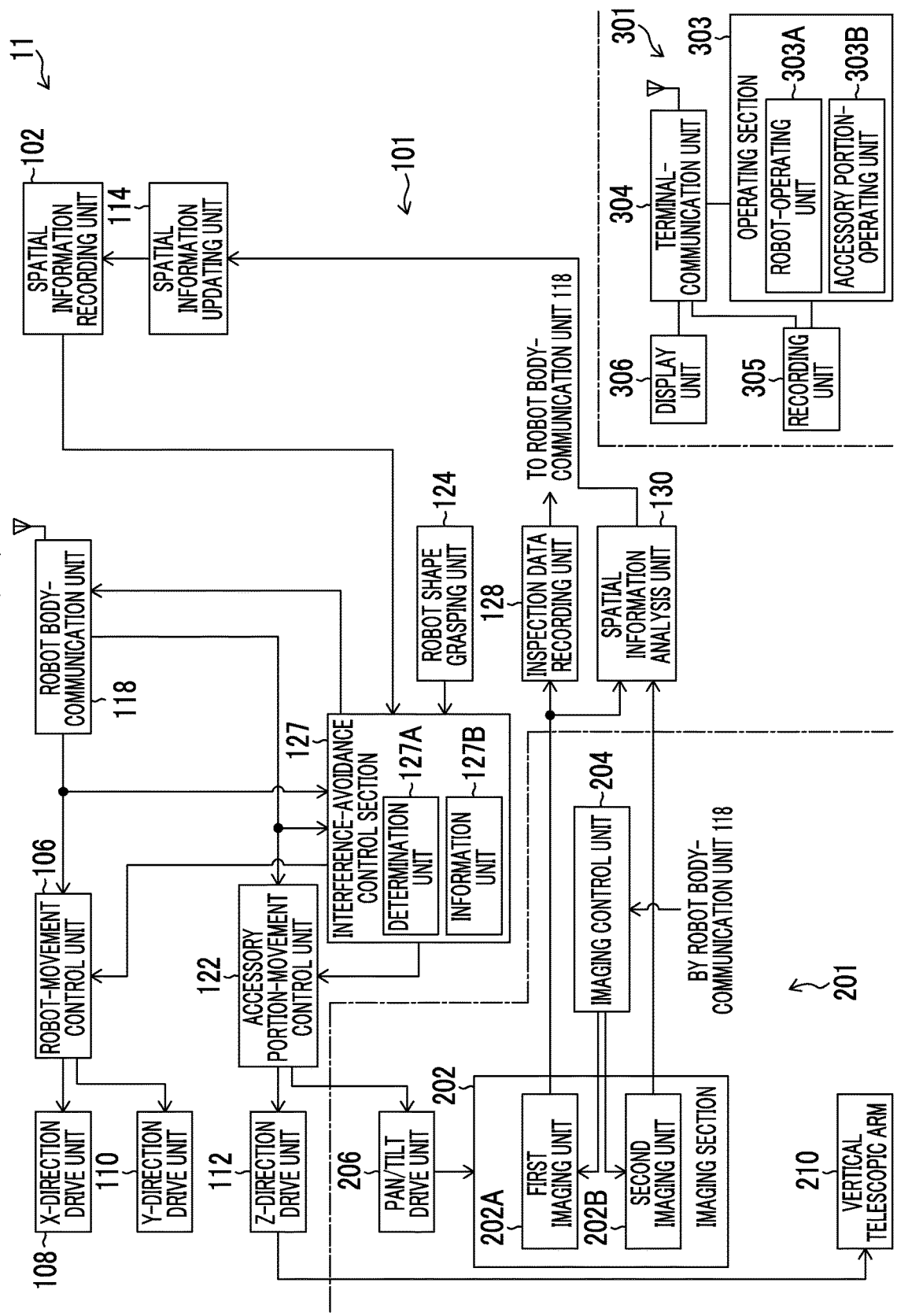
FIG. 9 is a block diagram showing the configuration of a robot device according to a second embodiment.

The configuration of the robot device 11 according to the second embodiment is shown in FIG. 9. Components common to the robot device 10 according to the first embodiment will be denoted by the same reference numerals as the components of the robot device 10, and the detailed description thereof will be omitted.

<Operation of Robot Device on Terminal>

In the robot device 11, a terminal 301 includes an operating section 303. The operating section 303 includes a robot-operating unit 303A that outputs X and Y-direction movement commands for a robot body 101 on the basis of an operator's manual operation, and an accessory portion-operating unit 303B that outputs commands for controlling the movement of the accessory portion 201 (the elongation and contraction of the vertical telescopic arm 210 and the pan/tilt of the imaging section 202) and the imaging of the accessory portion 201 on the basis of an operator's manual operation. The movement commands output from the robot-operating unit 303A and the accessory portion-operating unit 303B are transmitted to the robot body-communication unit 118 through the terminal-communication unit 304, and the robot-movement control unit 106 and the accessory portion-movement control unit 122 perform the control of the movement of the robot body 101 and the accessory portion 200 on the basis of these movement commands.

<Countermeasure Against Case in which Interference is Predicted>

In a case in which the robot-operating unit 303A and the accessory portion-operating unit 303B are operated, the robot body 101 and the accessory portion 201 are moved, are deformed, or are changed in posture on the basis of the commands output from the robot-operating unit 303A and the accessory portion-operating unit 303B. However, there is a case where the robot device 11 and the bridge 1 interfere with each other depending on the direction and the degree of movement or deformation. In regard to this situation, in the robot device 11, a determination unit 127A of an interference-avoidance control section 127 determines whether or not the robot device 11 and the bridge 1 interfere with each other. If it is determined that the robot device 11 and the bridge 1 interfere with each other, an information unit 127B stops the operation of at least one of the robot-movement control unit 106 or the accessory portion-movement control unit 122 and outputs a signal for issuing a warning. The terminal 301 receives this signal through the robot body-communication unit 118 and the terminal-communication unit 304, and makes the display unit 306 display a message for issuing a warning. An operator can operate the robot-operating unit 303A and the accessory portion-operating unit 303B again according to this message and make the robot-operating unit 303A and the accessory portion-operating unit 303B output movement commands that allow interference not to occur. The detail of a countermeasure against a case in which the interference is predicted will be described later.

Next, a case in which the inspection of a structure is semiautomatically performed will be described. The fact that the inspection of a structure is semiautomatically performed means that an operator's operation is performed at a part of an inspection operation.

Figure 10:
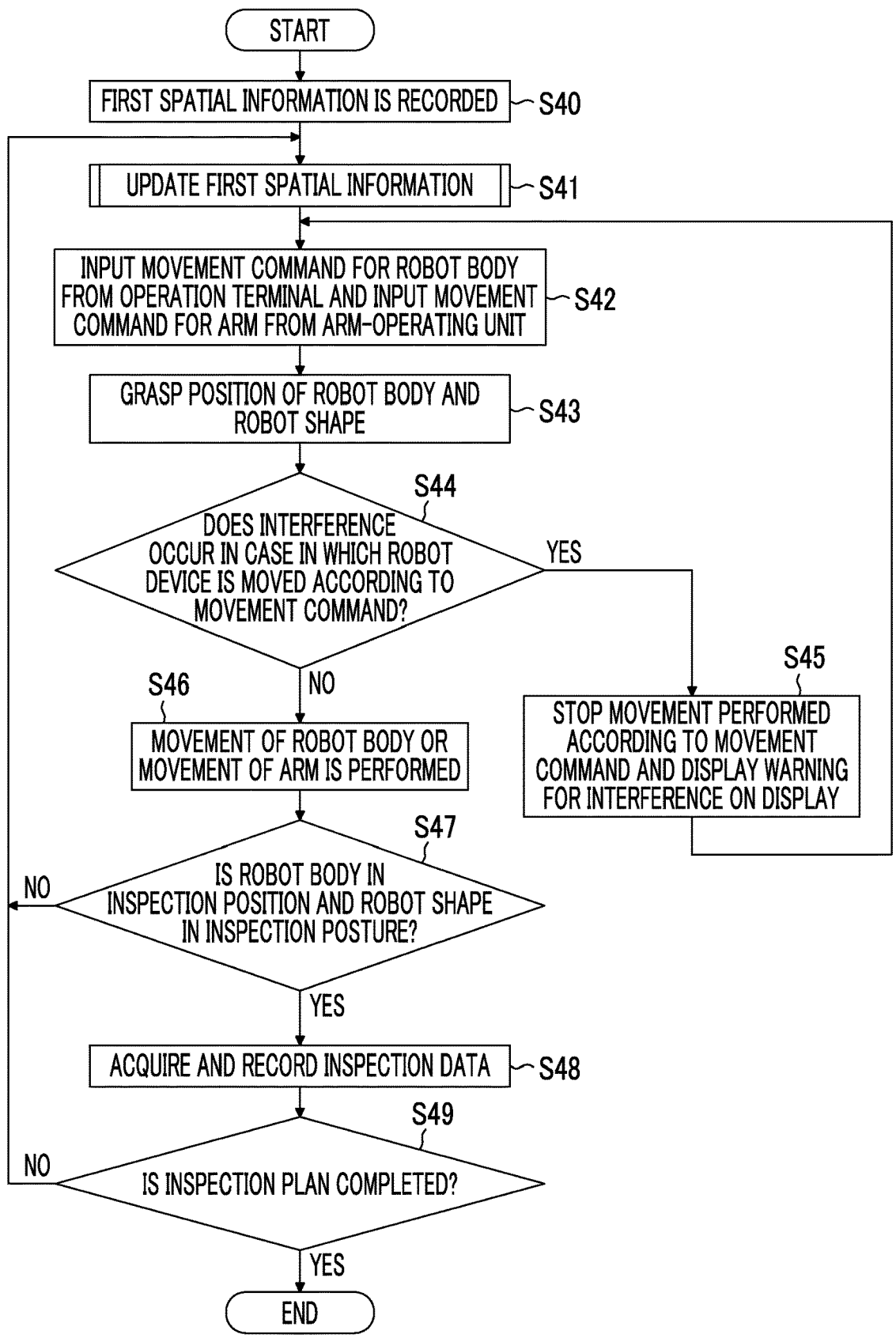
FIG. 10 is a flow chart showing processing of inspection work of the second embodiment.

FIG. 10 is a flow chart illustrating an inspection step of inspecting a structure. First, as described in FIG. 6, in the preparation step, the first spatial information (approximate spatial information) is recorded in the spatial information recording unit 102 (Step S40). Then, the first spatial information is updated by the spatial information updating unit 114 (Step S41).

Since the content of a subroutine (Step S41) for the first spatial information performed by the spatial information updating unit 114 is the same as that described in FIG. 8, the description of the content of the subroutine will be omitted.

After the first spatial information is updated, a movement command for the robot body 101 is input to the robot-movement control unit 106 and a movement command for the accessory portion 201 is input to the accessory portion-movement control unit 122 (Step S42). In the case of FIG. 10, in the terminal 301, the movement commands, which are received by the robot-operating unit 303A and the accessory portion-operating unit 303B, are input to the robot-movement control unit 106 and the accessory portion-movement control unit 122 through the terminal-communication unit 304 and the robot body-communication unit 118. Further, the movement commands (the movement command for the robot body 101 and the movement command for the accessory portion 201), which are received by the robot body-communication unit 118, are also input to the interference-avoidance control section 127.

Further, the robot shape grasping unit 124 grasps the position of the robot body 101 and the shape of the accessory portion 201 on the basis of information that is acquired from the X-direction drive unit 108, the Y-direction drive unit 110, and the Z-direction drive unit 112 (Step S43).

After that, the determination unit 127A of the interference-avoidance control section 127 determines whether or not the robot device 11 and the structure interfere with each other on the basis of the robot shape grasped by the robot shape grasping unit 124, the movement commands (the movement command for the robot body 101 and the movement command for the accessory portion 201), and the first spatial information transmitted from the spatial information recording unit 102 (Step S44). If the determination unit 127A determines that the robot device 10 interferes with the structure (YES in Step S44), the information unit 127B stops the movement of the robot body 101 and the movement of the accessory portion 201 so as to avoid the interference between the robot device 11 and the structure (Step S45). Further, if at least the determination unit 127A determines that the robot device 11 interferes with the structure, the information unit 127B warns an operator about a concern for interference by using the display unit 306 of the terminal 301 through the robot body-communication unit 118 (Step S45).

The operator who recognizes a warning about a concern for interference inputs movement commands to the robot-operating unit 303A and the accessory portion-operating unit 303B of the terminal 301 again so that a collision between the robot device 11 and the structure is avoided.

On the other hand, if the determination unit 127A determines that the robot device 10 does not interfere with the structure (NO in Step S44), the movement of the robot body 101 is performed according to the movement command for the robot body 101, which is received by the robot body-communication unit 118, by the robot-movement control unit 106 or the movement of the accessory portion 201 is performed according to the movement command for the accessory portion 201, which is received by the robot body-communication unit 118, by the accessory portion-movement control unit 122 (Step S46).

Then, the operator confirms the movement and posture of the robot device 11 and determines whether or not the robot body 101 is in the inspection position and the robot shape is the inspection posture (Step S47). If the robot body 101 is not in the inspection position or the robot shape is not in the inspection posture (NO in Step S47), a subroutine for updating the first spatial information is performed again (Step S41). On the other hand, if the robot body 101 is in the inspection position and the robot shape is in the inspection posture (YES in Step S47), the operator gives a command for acquiring inspection data through the terminal 301. Then, an inspection image (inspection data) is acquired by the first imaging unit 202A.

After that, the operator determines whether or not the inspection plan is completed. If the inspection plan is not completed (No in Step S49), a subroutine for updating the first spatial information is performed again (Step S41). On the other hand, if it is determined that the inspection plan is completed by the inspection data recording unit 128 (YES in Step S49), a command for ending inspection is output to the robot-movement command unit 104 and the accessory portion-movement command unit 120.

Each configuration and function having been described above can be appropriately realized by arbitrary hardware, arbitrary software, or a combination of both arbitrary hardware and arbitrary software. For example, the invention can also be applied to a program that makes a computer perform the above-mentioned processing steps (processing procedure), a computer-readable recording medium (non-transitory recording medium) in which such a program is recorded, or a computer in which such a program can be installed.

[Others]

The invention is not limited to a robot device that inspects or senses a bridge, and can also be applied to a robot device that performs the inspection and the like of structures (for example, a nuclear reactor, a pylon, a building, and the like) other than a bridge. Further, it goes without saying that the form and function of a robot device vary depending on a structure to which the robot device is applied. For example, various robot devices, such as a bipedal robot, a quadruped robot, a robot travelling by using a caterpillar, and a robot including an articulated arm (for example, portions, such as an upper arm formed in the shape of the human arm, a forearm, and a hand) as an accessory portion attached to a robot body, are considered as the robot device.

Furthermore, the spatial information acquisition section of this embodiment includes the imaging section 202 and the spatial information analysis unit 130, but is not limited thereto. A laser scanning device that measures a direction and a distance through the irradiation of a laser beam, a unit that acquires a range image by a time-of-flight (TOF) method, and the like can be applied as the spatial information acquisition section. In short, any unit, which acquires spatial information about the peripheral area of the robot device 10, may be used as the spatial information acquisition section.

It goes without saying that the spatial information about the peripheral area of the robot device 10, which is obtained by the imaging section 202 or the like and is based on the imaging section 202, is integrated with the reference position of the robot device 10 (for example, the three-dimensional position of the camera installation part 210A of the vertical telescopic arm 210 on which the imaging section 202 is mounted) to form second spatial information (three-dimensional shape data) which can update the initial first spatial information (approximate spatial information) about an area associated with the structure by overwriting.

Further, the reference position of the robot device 10 can be acquired from the values of encoders of the X-direction drive unit 108, the Y-direction drive unit 110, and the Z-direction drive unit 112, but a highly accurate reference position can be acquired by the use (combination use) of spatial information that is acquired by the spatial information acquisition section, such as the imaging section 202.

It goes without saying that the invention is not limited to the above-mentioned embodiments and may have various modifications without departing from the scope of the invention.

EXPLANATION OF REFERENCES

1: bridge
10, 11: robot device
100, 101: robot body
102: spatial information recording unit
104: robot-movement command unit
106: robot-movement control unit
108: X-direction drive unit
110: Y-direction drive unit
112: Z-direction drive unit
114: spatial information updating unit
116: inspection plan recording unit
118: robot body-communication unit
120: accessory portion-movement command unit
122: accessory portion-movement control unit
124: robot shape grasping unit
126, 127: interference-avoidance control section
126A: determination unit
126B: operation changing unit
128: inspection data recording unit
130: spatial information analysis unit
132: inspection plan-implementation control unit
200, 201: accessory portion
202: imaging section
202A: first imaging unit
202B: second imaging unit
204: imaging control unit
206: pan/tilt drive unit 210: vertical telescopic arm
300, 301: terminal
302: inspection plan input unit
303: operating section
303A: robot-operating unit
303B: accessory portion-operating unit
304: terminal-communication unit
305: recording unit
306: display unit

What is claimed is:

1. An inspection device for inspecting a structure, comprising:
   a robot body;
   a first controller that controls movement of the robot body;
   an accessory that is attached to the inspection device;
   an accessory controller that controls movement of the accessory with respect to the robot body;
   an inspection data sensor that is included in the accessory and acquires an inspection data of the structure; and
   a processor configured to:
   acquire first spatial information which includes three-dimensional information of an area with the structure, the area is that in which the inspection device is configured to move, and records the first spatial information in a recording medium;
   acquire an inspection plan including a movement plan for the inspection device and information on an inspection position of the structure, and record the inspection plan in the recording medium;
   acquire second spatial information about the area with the structure while the inspection device moves through the area;
   update the first spatial information with the second spatial information, which is more detailed spatial information than the first spatial information;
   record the updated first spatial information in the recording medium;
   output a movement command for moving the robot body to the first controller on the basis of the inspection plan and the updated first spatial information;
   spatially grasp a shape of the robot body and the accessory as a robot shape;
   determine whether or not the robot body is positioned in the inspection position and the robot shape is in an inspection posture; and
   acquire the inspection data using the inspection data sensor in a case where the robot body is determined to be positioned in the inspection position and the robot shape is in the inspection posture.

2. The inspection device according to claim 1,
   wherein the inspection data sensor includes an imager configured to take an image of the area, and
   wherein the processor is further configured to calculate the second spatial information about the area on the basis of the image taken by the imager.

3. The inspection device according to claim 2,
   wherein
   the accessory controller controls the movement of the accessory on the basis of the updated first spatial information recorded in the recording medium.

4. The inspection device according to claim 2, further comprising:
   a robot operator that outputs a movement command for the robot body by a manual operation; and
   an accessory operator that outputs a movement command for the accessory by a manual operation,
   wherein the first controller controls the movement of the robot body on the basis of the movement command output from the robot operator, and
   the accessory controller controls the movement of the accessory on the basis of the movement command output from the accessory operator.

5. The inspection device according to claim 2,
   wherein
   the accessory controller controls the movement of the accessory on the basis of the updated first spatial information recorded in the recording medium, and
   the processor is further configured to
   determine whether or not the inspection device and the structure interfere with each other in a case in which the robot body is moved by the first controller or a case in which the accessory is moved by the accessory controller, on the basis of the updated first spatial information recorded in the recording medium and the robot shape, and
   change the operation of at least one of the first controller or the accessory controller to avoid interference between the inspection device and the structure in a case in which the inspection device and the structure are determined to interfere with each other.

6. The inspection device according to claim 2, further comprising:
   a robot operator that outputs a movement command for the robot body by a manual operation; and
   an accessory operator that outputs a movement command for the accessory portion by a manual operation,
   wherein the first controller controls the movement of the robot body on the basis of the movement command output from the robot operator, and
   the accessory controller controls the movement of the accessory on the basis of the movement command output from the accessory operator, and
   the processor is further configured to
   determine whether or not the inspection device and the structure interfere with each other in a case in which the robot body is moved according to the movement command output from the robot operator or a case in which the accessory is moved according to the movement command output from the accessory operator, on the basis of the updated first spatial information recorded in the recording medium and the robot shape,
   stop the operation of at least one of the first controller or the accessory controller, and
   issue a warning in a case in which the inspection device and the structure are determined to interfere with each other.

7. The inspection device according to claim 2,
   wherein the inspection data sensor includes at least one of a static image pickup, a hammering tester, or an ultrasonic tester.

8. The inspection device according to claim 1,
   wherein
   the accessory controller controls the movement of the accessory on the basis of the updated first spatial information recorded in the recording medium.

9. The inspection device according to claim 1, further comprising:
   a robot operator that outputs a movement command for the robot body by a manual operation; and
   an accessory operator that outputs a movement command for the accessory by a manual operation, wherein the first controller controls the movement of the robot body on the basis of the movement command output from the robot operator, and the accessory controller controls the movement of the accessory on the basis of the movement command output from the accessory operator.

10. The inspection device according to claim 1, wherein the accessory controller controls the movement of the accessory on the basis of the updated first spatial information recorded in the recording medium, and the processor is further configured to determine whether or not the inspection device and the structure interfere with each other in a case in which the robot body is moved by the first controller or a case in which the accessory is moved by the accessory controller, on the basis of the updated first spatial information recorded in the recording medium and the robot shape, and change the operation of at least one of the first controller or the accessory controller to avoid interference between the inspection device and the structure in a case in which the inspection device and the structure are determined to interfere with each other.

11. The inspection device according to claim 1, further comprising:

a robot operator that outputs a movement command for the robot body by a manual operation; and an accessory operator that outputs a movement command for the accessory portion by a manual operation, wherein the first controller controls the movement of the robot body on the basis of the movement command output from the robot operator, and the accessory controller controls the movement of the accessory on the basis of the movement command output from the accessory operator, and the processor is further configured to determine whether or not the inspection device and the structure interfere with each other in a case in which the robot body is moved according to the movement command output from the robot operator or a case in which the accessory is moved according to the movement command output from the accessory operator, on the basis of the updated first spatial information recorded in the recording medium and the robot shape, stop the operation of at least one of the first controller or the accessory controller, and issue a warning in a case in which the inspection device and the structure are determined to interfere with each other.

12. The inspection device according to claim 1, wherein the inspection data sensor includes at least one of a static image pickup, a hammering tester, or an ultrasonic tester.

13. The inspection device according to claim 1, further comprising:

an inspection data recorder that records inspection data detected by the inspection data sensor in association with an inspected portion of the structure.

14. A method of controlling the movement of an inspection device including a robot body, an accessory that is attached to the inspection device and an inspection data sensor that is included in the accessory, the method comprising:

acquiring first spatial information which includes three-dimensional information of an area with a structure, the area is that in which the inspection device is configured to move;

acquiring an inspection plan including a movement plan for the inspection device and information on an inspection position of the structure;

acquiring second spatial information about the area with the structure while the inspection device moves through the area;

updating the first spatial information with the acquired second spatial information, which is more detailed spatial information than the first spatial information;

recording the updated first spatial information in a recording medium;

outputting a movement command for moving the robot body on the basis of the inspection plan and the updated first spatial information;

spatially grasping the shapes of the robot body and the accessory as a robot shape;

determining whether or not the robot body is positioned in the inspection position and the robot shape is in an inspection posture; and acquiring the inspection data using the inspection data sensor in a case where the robot body is determined to be positioned in the inspection position and the robot shape is determined to be in the inspection posture.

15. The inspection device according to claim 1, wherein the processor is further configured to change the movement command to avoid interference between the inspection device and the structure on the basis of the inspection plan, the updated first spatial information and the robot shape.

* * * * *